United States Patent
Yoshida et al.

(10) Patent No.: US 10,384,567 B2
(45) Date of Patent: Aug. 20, 2019

(54) VEHICLE SEAT

(71) Applicant: TS TECH CO., LTD., Asaka-shi, Saitama (JP)

(72) Inventors: Hajime Yoshida, Tochigi (JP); Koji Onuma, Tochigi (JP); Hideki Usami, Tochigi (JP); Kazuhiro Hayashi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/526,243

(22) PCT Filed: Nov. 11, 2015

(86) PCT No.: PCT/JP2015/081724
§ 371 (c)(1),
(2) Date: May 11, 2017

(87) PCT Pub. No.: WO2016/076352
PCT Pub. Date: May 19, 2016

(65) Prior Publication Data
US 2017/0313209 A1     Nov. 2, 2017

(30) Foreign Application Priority Data

Nov. 12, 2014   (JP) ................................ 2014-229887
Apr. 14, 2015   (JP) ................................ 2015-082803

(51) Int. Cl.
*B60N 2/07* (2006.01)
*B60N 2/02* (2006.01)
(Continued)

(52) U.S. Cl.
CPC ............. *B60N 2/07* (2013.01); *B60N 2/0232* (2013.01); *B60N 2/22* (2013.01); *B60N 2/64* (2013.01);
(Continued)

(58) Field of Classification Search
CPC .......... B60N 2/07; B60N 2/0232; B60N 2/22; B60N 2/64; B60N 2/68; B60N 2002/0236
See application file for complete search history.

(56) References Cited

U.S. PATENT DOCUMENTS 4,152,024 A * 5/1979 Farelli ...................... B60N 2/12
                                                297/341
5,161,765 A * 11/1992 Wilson ................... B60N 2/062
                                                248/425

(Continued)

FOREIGN PATENT DOCUMENTS

CN        1642775        7/2005
CN        101244701 A    8/2008
(Continued)

OTHER PUBLICATIONS

International Search Report for PCT/JP2015/081724, dated Feb. 16, 2016, 11 pages including English translation.
(Continued)

*Primary Examiner* — Philip F Gabler
(74) *Attorney, Agent, or Firm* — Hamre, Schumann, Mueller & Larson, P.C.

(57) ABSTRACT

A vehicle seat includes a seat cushion frame, a slide mechanism, a drive source, and a transmission mechanism configured to receive a driving force from the drive source and to cause the seat cushion frame to move in a front-rear direction. The slide mechanism includes a guide member extending in the front-rear direction and a slide member movable along the guide member relative to the guide member; the seat cushion frame is fixed to one of the guide member and the slide member, and another of the guide member and the slide member is fixed to a floor of a vehicle; and the drive source is fixed to the floor of the vehicle.

17 Claims, 11 Drawing Sheets

(51) Int. Cl.
  *B60N 2/22* (2006.01)
  *B60N 2/64* (2006.01)
  *B60N 2/68* (2006.01)

(52) U.S. Cl.
  CPC ........ *B60N 2/68* (2013.01); *B60N 2002/0236* (2013.01)

(56) References Cited

U.S. PATENT DOCUMENTS

| | | | |
|---|---|---|---|
| 6,517,157 B1* | 2/2003 | Vorac | B60N 2/0232 297/344.13 |
| 6,691,970 B1* | 2/2004 | Sutton, Sr. | B60N 2/062 248/425 |
| 9,050,907 B2* | 6/2015 | Becker | B21D 19/08 |
| 9,315,118 B2 | 4/2016 | Tuji | |
| 9,849,813 B2* | 12/2017 | Davis | B60N 2/929 |
| 2006/0061182 A1* | 3/2006 | Park | B60N 2/06 297/378.1 |
| 2006/0108848 A1* | 5/2006 | Williamson | A47C 3/18 297/344.24 |
| 2009/0167073 A1 | 7/2009 | Fujieda | |
| 2012/0007401 A1* | 1/2012 | Hashimoto | B60N 2/0232 297/344.13 |
| 2013/0313876 A1* | 11/2013 | Perrin | B60N 2/24 297/344.13 |
| 2014/0374563 A1 | 12/2014 | Tuji | |
| 2017/0275003 A1* | 9/2017 | Erhel | B60N 2/06 |
| 2017/0305319 A1* | 10/2017 | Yamakawa | B29C 44/1257 |

FOREIGN PATENT DOCUMENTS

| | | |
|---|---|---|
| JP | H07186790 | 7/1995 |
| JP | H1086720 | 4/1998 |
| JP | H11311303 | 11/1999 |
| JP | 2007331445 | 12/2007 |
| JP | 2009154691 | 7/2009 |
| JP | 2015003590 | 1/2015 |

OTHER PUBLICATIONS

Office Action issued for Chinese Patent Application No. 201580061150.6, dated Jul. 30, 2018, 8 pages including English translation.
Office Action issued for Chinese Patent Application No. 201580061150.6, dated Mar. 26, 2019, 12 pages including English translation.
Office Action issued for Japanese Patent Application No. 2015-082803, dated Jun. 4, 2019, 7 pages including English translation.
Office Action, Chinese Patent Application No. 2015800611506, Jun. 21, 2019, with English translation (6 pages).

* cited by examiner

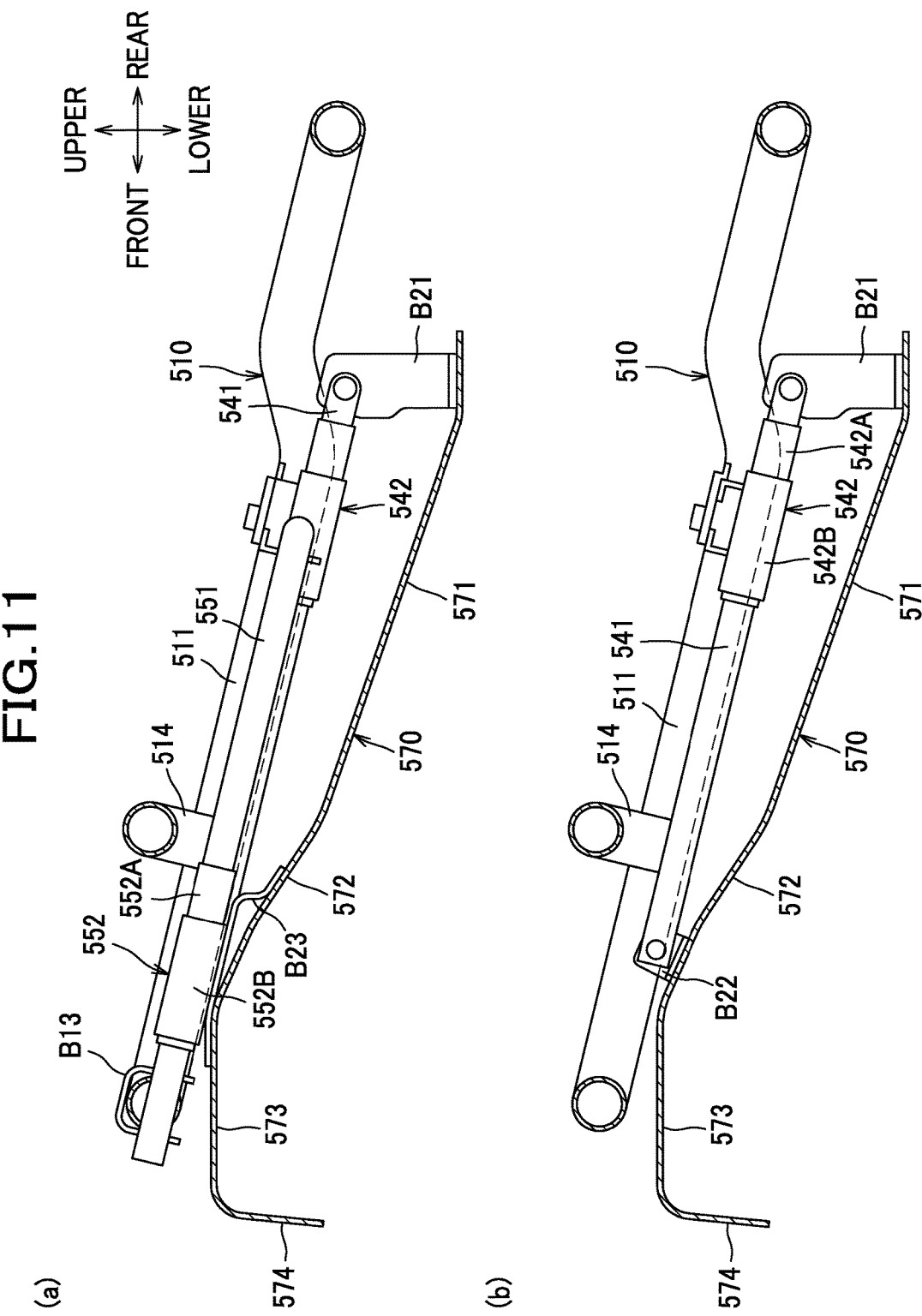

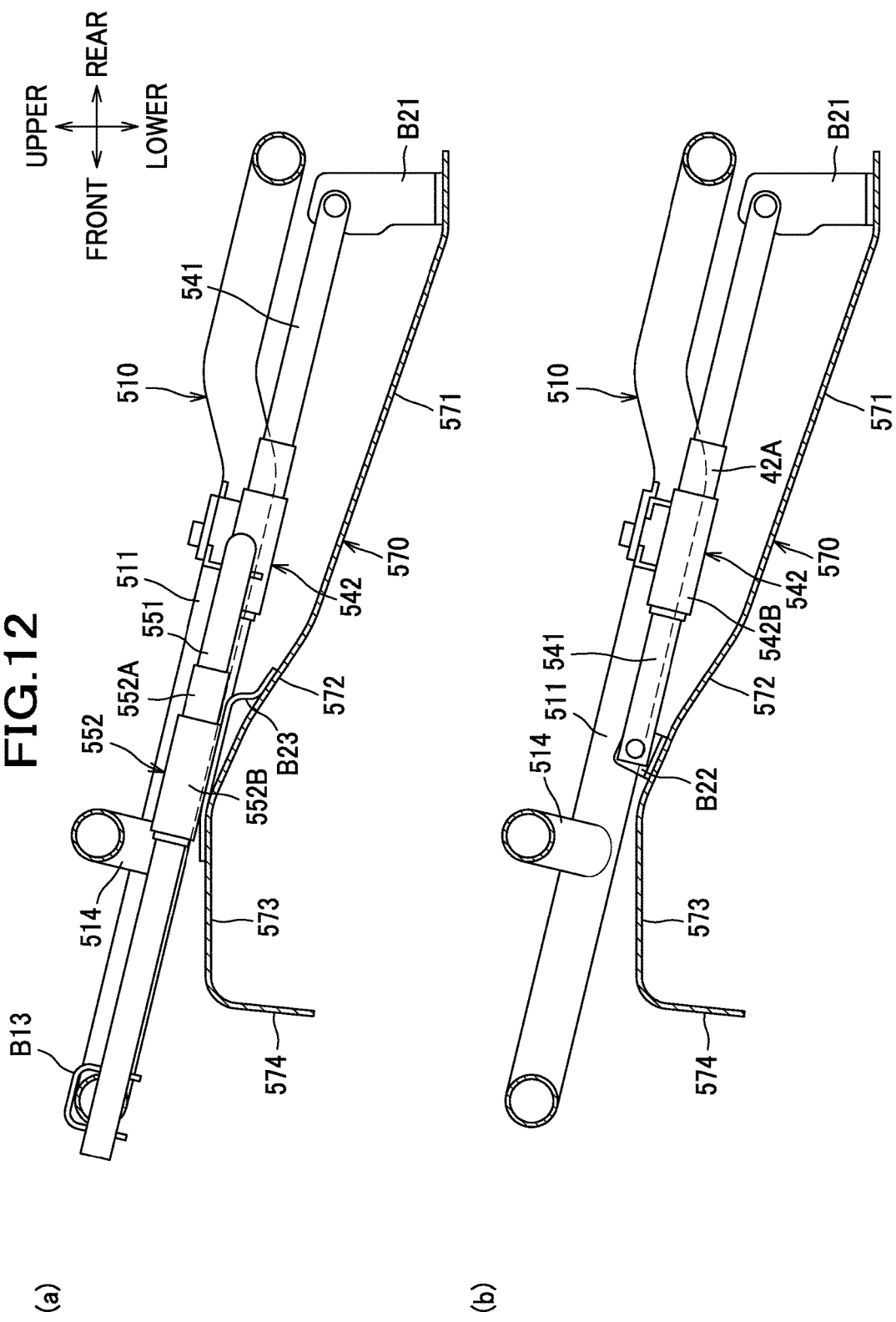

VEHICLE SEAT

TECHNICAL FIELD

The present invention relates to a vehicle seat including a seat cushion movable in a front-rear direction.

BACKGROUND ART

A vehicle seat configured such that a seat cushion is rendered movable in a front-rear direction by the use of a driving force of a motor is hitherto known in the art. For example, a vehicle seat disclosed in Patent Document 1 includes left and right lower rails elongate in the front-rear direction which are fixed on the floor of a vehicle, left and right upper rails configured to support a seat cushion and to be movable along the lower rails, a motor, and a transmission mechanism configured to receive a driving force from the motor and to cause the seat cushion to move in the front-rear direction. The motor is disposed on a bracket which connects the left and right upper rails.

There is also known in the art a vehicle seat for use as a rear seat or the like in an automobile, which is configured such that a seat cushion slides frontward according as a lower portion of a seat back juts out frontward. For example, a vehicle seat disclosed in Patent Document 2 includes a lower slide unit fixed to the floor of a vehicle body, and an upper slide unit fixed to a seat cushion frame, wherein a seat cushion is caused to slide in the front-rear direction by the movement of the upper slide unit along the lower slide unit.

CITATION LIST

Patent Literature

Patent Document 1: JP 2015-3590 A
Patent Document 2: JP H10-86720 A

SUMMARY OF INVENTION

Technical Problem

With the technical solution disclosed in Patent Document 1 as described above, however, arrangement of the motor on the bracket connecting the upper rails would disadvantageously make an assembly configured to slide in the front-rear direction relative to the floor heavy.

With this in view, there is a need to provide a vehicle seat with a configuration in which a seat cushion is movable in the front-rear direction while an assembly configured to slide in the front-rear direction is made lightweight.

It would be further preferable to check any increase of the number of parts.

With the technical solution disclosed in Patent Document 2 as described above, on the other hand, provision of the upper slide unit and the lower slide unit between the floor of the vehicle body and the seat cushion frame would make the position of the seat cushion frame higher than that of an alternative configuration in which no upper or lower slide unit is provided. This would necessitate making a cushion material provided to cover the seat cushion frame thinner, and the thus-thinner cushion material would disadvantageously impair the comfort of the occupant to be seated thereon.

Therefore, there is a need to provide a vehicle seat with a seat cushion configured to be movable in the front-rear direction while the comfort of the occupant can be improved.

There is also a need to provide a vehicle seat in which deformation of a slide mechanism for guiding a motion of the seat cushion frame can be suppressed.

It would be further preferable to provide a vehicle seat in which the slide mechanism can be arranged to conform to the shape of a portion of the vehicle body on which the seat cushion is disposed.

Solution to Problem

A vehicle seat comprising a seat cushion frame, a slide mechanism, a drive source, and a transmission mechanism configured to receive a driving force from the drive source and to cause the seat cushion frame to move in a front-rear direction is disclosed. The slide mechanism includes a guide member extending in the front-rear direction and a slide member movable along the guide member relative to the guide member, the seat cushion frame being fixed to one of the guide member and the slide member, another of the guide member and the slide member being fixed to a floor of a vehicle. The drive source is fixed to the floor. For example, in one embodiment, the guide member includes a pair of rails fixed to the floor, and the slide member includes a pair of sliders engageable with the pair of rails and slidable relative to the pair of rails, and the seat cushion frame is fixed to the pair of sliders.

With this configuration, in which the drive source is fixed to the floor of the vehicle and not disposed on an assembly configured to slide relative to the floor, the assembly configured to slide relative to the floor can be made lightweight.

The above-described vehicle seat may preferably include a first bracket connecting the pair of rails, wherein the drive source is fixed to the first bracket.

In the aforementioned vehicle seat with the first bracket, optionally, the first bracket may preferably be fixed to the floor.

With this configuration, the pair of rails and the drive source can be fixed to the floor with a single part, and thus increase in the number of parts can be suppressed.

The vehicle seat as described above may comprise a second bracket fixed to the floor and configured to support the rails, and a support frame fixed to the second bracket, and may preferably be configured such that the support frame includes a first engageable portion so extending as to have a distal end facing downward, wherein the seat cushion frame includes a pair of left and right side frames, and wherein the side frames include a second engageable portion so extending as to have a distal end facing upward, the second engageable portion being engageable with the first engageable portion in an upward-downward direction.

With this configuration, when the seat cushion frame tends to move upward (e.g., in a collision of a vehicle), the first engageable portion and the second engageable portion are engaged with each other, so that the seat cushion frame can be prevented from separating from the floor.

It is preferable that a distal end portion of the second engageable portion is inclined toward a proximal end portion of the second engageable portion with respect to a vertical direction, and a distal end portion of the first engageable portion is inclined to a direction away from the proximal end portion of the second engageable portion with respect to the vertical direction.

With this configuration, the second engageable portion can be prevented from getting disengaged from the first engageable portion when the second engageable portion tends to move upward.

The vehicle seat as described above may include a cushion pad with which the seat cushion frame is covered, and the cushion pad may include a wire having a hook with which the wire is hooked on to the seat cushion frame.

With this configuration, furnishing the seat cushion frame with the cushion pad can be done simply by engaging the hook of the cushion pad with the seat cushion frame only, thus with increased ease.

The vehicle seat as described above may be configured such that the seat cushion frame includes a pair of left and right side frames and a pipe frame connecting the pair of side frames, wherein the side frames are made of sheet metal, and wherein the pipe frame includes left and right end portions placed on upper surfaces of the side frames and welded to the side frames.

With this configuration, a load placed from an occupant on the pipe frame can be received by the side frames.

The vehicle seat as described above may further include a pan frame fixed to the seat cushion frame, and may preferably be configured such that the pan frame has an undersurface of which a portion lying over the transmission mechanism is recessed upward.

With this configuration, the pan frame can be disposed in a lower position while suppressing interference of the transmission mechanism with the pan frame; therefore, the cushion pad with which the seat cushion frame is covered can be made thicker.

The vehicle seat as described above may further include a base portion fixed to the floor, and may be configured such that the seat cushion frame includes a pair of left and right side frames, wherein the guide member includes a guide shaft, wherein the guide shaft or the slide member is fixed to the base portion, and wherein at least part of the guide shaft overlaps the side frames as viewed from a left or right direction.

With this configuration, the seat cushion frame can be provided in a lower position in comparison with an alternative configuration in which the guide shaft does not overlap the side frames as viewed from the left or right direction. This can ensure that a sufficiently thick cushion material is provided for covering the seat cushion frame, so that the comfort of an occupant can be improved.

In the vehicle seat as described above, the slide mechanism may include two pairs of slide mechanisms, one pair being disposed at a left side, and another pair disposed at a right side (i.e., the total four units of the guide shaft and the slide member).

With this configuration, a load placed from an occupant on the seat cushion frame can be distributed, so that the distortion of the slide mechanism can be suppressed.

A pair of the slide mechanisms of the vehicle seat as described above may include two guide shafts disposed in positions shifted in the front-rear direction.

With this configuration, the guide shafts can be arranged to conform to the shape of a portion of the vehicle on which the seat cushion is disposed.

A pair of the slide mechanisms of the vehicle seat as described above may preferably include two guide shafts of which portions coextensive (located in same positions) in the front-rear direction are disposed at a same height.

With this configuration, the seat cushion frame can be provided in a lower position in comparison with an alternative configuration in which the two guide shafts are disposed in positions shifted from each other in an upward-downward direction.

A pair of the slide mechanisms of the vehicle seat as described above may include two guide shafts of which portions coextensive in the front-rear direction are disposed in positions shifted from each other in an upward-downward direction.

With this configuration, the guide shafts can be arranged to conform to the shape of a portion of the vehicle on which the seat cushion is disposed.

A pair of the slide mechanisms of the vehicle seat as described above may preferably include two slide members which are disposed in positions separate from each other in the front-rear direction, a front slide member being fixed to the base portion, a guide shaft corresponding to the front slide member being fixed to the seat cushion frame, a rear slide member being fixed to the seat cushion frame, and a guide shaft corresponding to the rear slide member being fixed to the base portion.

With this configuration, the guide shafts can be provided in such an arrangement that the guide shafts would not protrude out of the seat cushion frame frontward or rearward when the seat cushion frame moves in the front-rear direction.

The vehicle seat as described above may preferably be configured such that all guide shafts are disposed between the pair of side frames when viewed from above or below.

With this configuration, the vehicle seat can be miniaturized in comparison with an alternative configuration in which the guide shafts are disposed outside of the pair of side frames.

The vehicle seat as described above may be configured such that the transmission mechanism includes an actuator connected to the seat cushion frame, and a screw shaft extending in the front-rear direction, the screw shaft being configured to transmit a driving force from the drive source to the actuator, wherein the screw shaft is disposed in a center between the pair of side frames.

With this configuration, even if a portion of the cushion material under which the screw shaft is provided is made thinner, an occupant is unlikely to feel uncomfortable because the center between the pair of side frames is a portion with which the buttocks of the occupant will not contact.

In the vehicle seat as described above, the side frames may preferably be made of pipes.

With this configuration, the thickness of the seat cushion can be reduced in comparison with an alternative configuration in which the side frames are made of sheet metal.

BRIEF DESCRIPTION OF DRAWINGS

FIG. 11 includes (a) a sectional view showing relative positions of an inner slide mechanism and the side frame, and (b) a sectional view showing relative positions of an outer slide mechanism and the side frame, as assumed when the seat cushion frame is in the rearmost position.

FIG. 12 includes (a) a sectional view showing relative positions of the inner slide mechanism and the side frame, and (b) a sectional view showing relative positions of the outer slide mechanism and the side frame, as assumed when the seat cushion frame has been moved to the front.

DESCRIPTION OF EMBODIMENTS

Hereafter, some illustrative embodiments will be described with reference to the drawings. To describe the present invention, the front/rear (frontward/rearward), left/right (leftward/rightward; lateral) and upper/lower (upward/downward; vertical) directions will be designated with reference to a person seated on the vehicle seat (occupant).

First, referring to FIGS. 1 to 7, a first embodiment is described.

Figure 1:
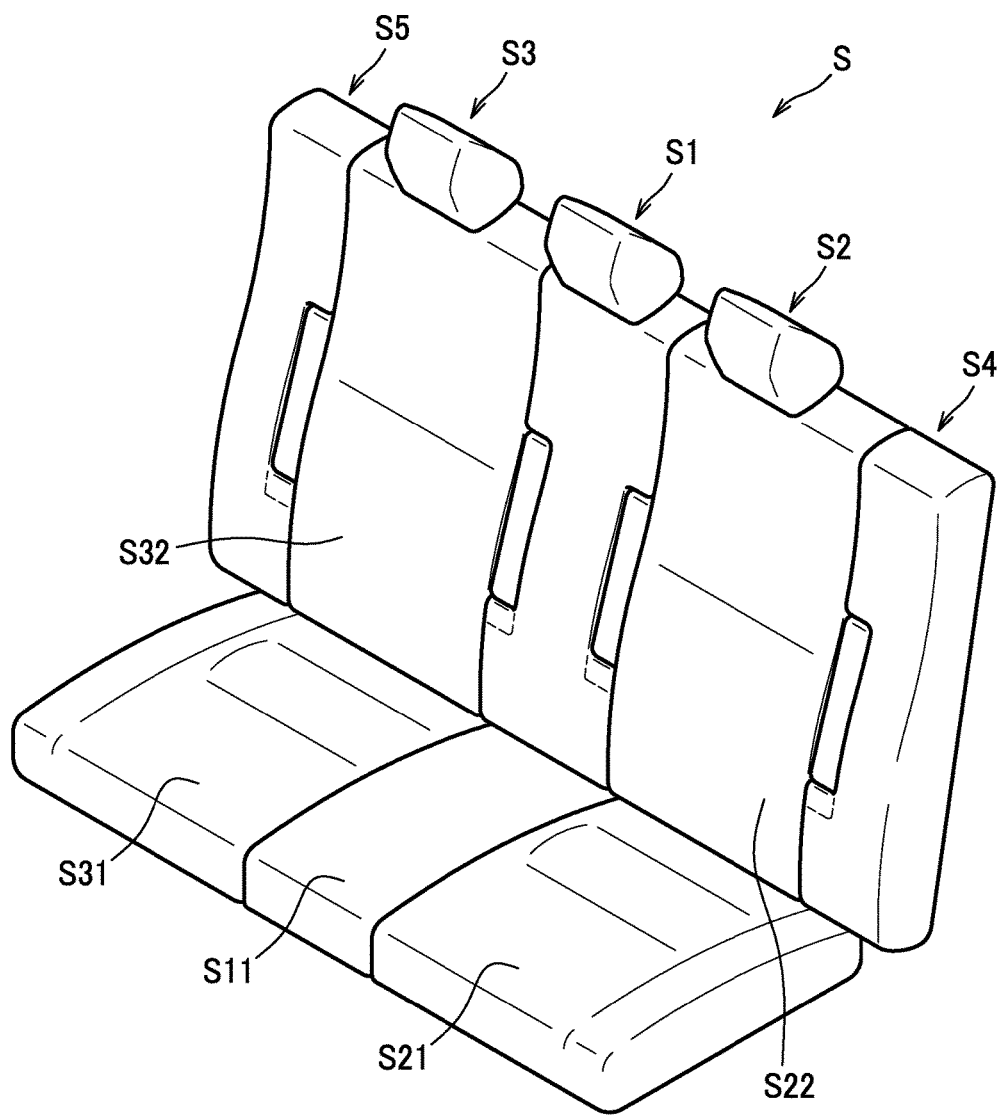
FIG. 1 is a perspective view of a car seat.

As shown in FIG. 1, a vehicle seat according to the first embodiment is configured as a car seat S for use in a rear seat of an automobile as an example of a vehicle. The car seat S mainly includes a center seat S1, a left seat S2 arranged adjacent to the left side of the center seat S1, a right seat S3 arranged adjacent to the right side of the center seat S1, a left side portion S4 arranged adjacent to the left side of a seat back S22 of the left seat S2, and a right side portion S5 arranged adjacent to the right side of a seat back S32 of the right seat S3. In the present embodiment, the car seat S is configured to be bilaterally symmetric; thus, in the following description, the left-side configuration including the left seat S2 is described.

The left seat S2 mainly includes a seat cushion S21 and a seat back S22. The right seat S3 mainly includes a seat cushion S31 and a seat back S32 which have the same constructions as those of the left seat S2.

Figure 2:
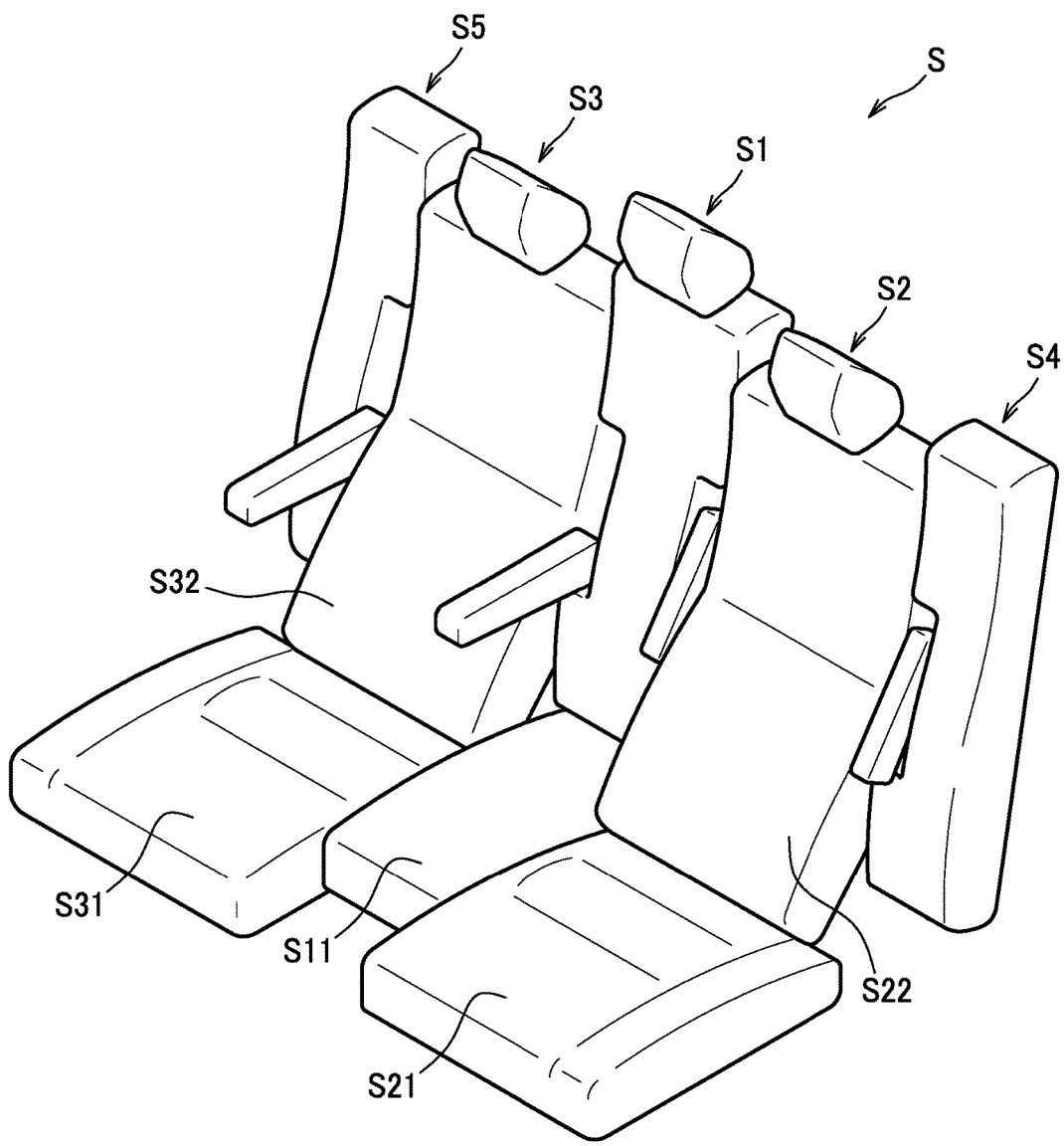
FIG. 2 is a perspective view showing a state in which seat cushions of a left seat and a right seat have been moved to the front.

The left seat S2 is, as shown in FIG. 2, configured such that the seat cushion S21 is slidable in the front-rear direction, and that the seat back S22 is configured to lean backward and down relative to the seat cushion S21 (capable of reclining) when the seat cushion S21 moves frontward.

Figure 3:
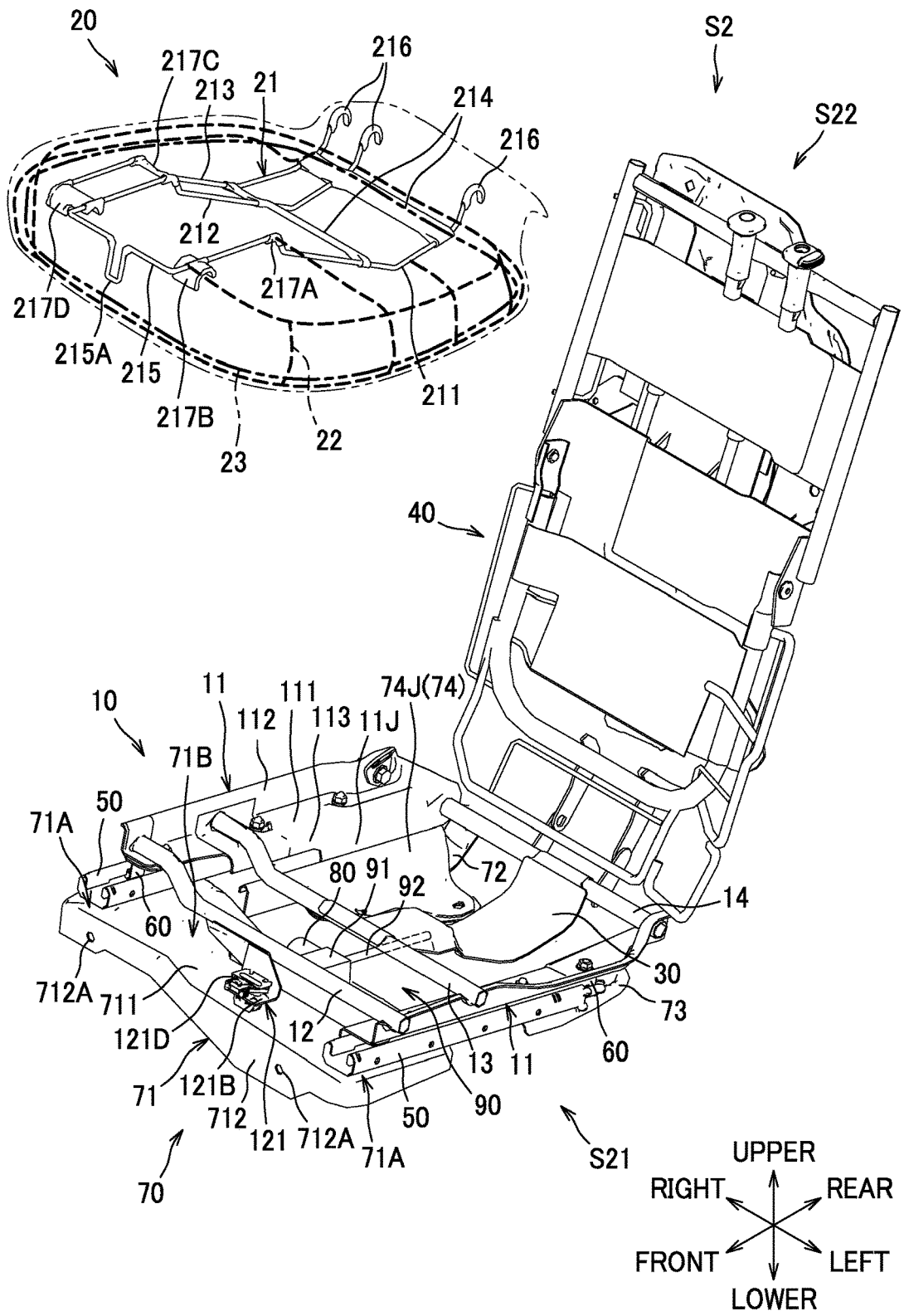
FIG. 3 is an exploded perspective view of a seat cushion frame, a cushion pad, a seat back frame, and others.

The seat cushion S21 includes a seat cushion frame 10 shaped substantially like a four-bar frame structure, a cushion pad 20 with which the seat cushion frame 10 is covered, and a pan frame 30, as shown in FIG. 3.

The seat back S22 includes a seat back frame 40, which is upholstered with a cushion material made of urethane foam or the like and an outer covering made of leather, fabrics, or the like.

Elements of the left seat S2 provided under the seat cushion frame 10 mainly include a pair of rails 50 (guide member) and a pair of sliders 60 (slide member) as an example of a slide mechanism, a base frame 70 as an example of a base portion, a drive source 80, and a transmission mechanism 90.

The pair of rails 50 are arranged side by side. Each rail 50 extends in the front-rear direction, and is fixed to a floor of the automobile.

The pair of sliders 60 are engageable with the pair of rails 50, and slidable relative to the pair of rails 50 in the front-rear direction.

The base frame 70 includes a first bracket 71 supporting front end portions of the pair of rails 50, a second bracket 72 supporting a rear end portion of the right rail 50, a third bracket 73 supporting a rear end portion of the left rail 50, and a support frame 74 fixed to the second bracket 72.

The first bracket 71 is a part made by bending sheet metal, and is fixed to the floor. The first bracket 71 includes a flat plate portion 711 extending along an upper surface of the floor, and a floor anchor portion 712 extending from a front end of the flat plate portion 711 downward. The floor anchor portion 712 has two through holes 712A provided at the left and at the right. The first bracket 71 is directly fixed to the floor using bolts inserted through the two through holes 712A and fastened to the floor.

The first bracket 71 is provided to connect the pair of rails 50. To be more specific, the first bracket 71 is disposed under the rails 50, and includes left and right support portions 71A to which the rails 50 are fixed, and a connecting portion 71B connecting the left and right support portions 71A.

The second bracket 72 and the third bracket 73 are made of sheet metal, respectively, and fixed to the floor. The support frame 74 is made of sheet metal. A detailed structure of the support frame 74 will be described later.

The seat cushion frame 10 is fixed to the pair of sliders 60 and configured to be movable together with the pair of sliders 60.

The seat cushion frame 10 includes a pair of left and right side frames 11, a first pipe frame 12 and a second pipe frame 13 as an example of a pipe frame connecting front end portions of the pair of side frames 11, and a third pipe frame 14 connecting rear end portions of the pair of side frames 11.

The side frames 11 are made by bending sheet metal, and each include a base portion 111 fixed to an upper wall of the slider 60, a first side wall portion 112 extending from a laterally outer end of the base portion 111 upward, and a second side wall portion 113 extending from a laterally inner end of the base portion 111 downward.

The first pipe frame 12 and the second pipe frame 13 are so arranged one behind another as to have their longitudinal directions oriented in the lateral direction. To be more specific, the second pipe frame 13 is disposed rearward of the first pipe frame 12.

The first pipe frame 12 and the second pipe frame 13 each include left and right end portions placed on upper surfaces of the left and right side frames 11 (more specifically, on upper surfaces of the base portions 111) and welded to the upper surfaces of the base portion 111. With this configuration, a load placed from an occupant on the first pipe frame 12 and the second pipe frame 13 can be received by the left and right side frames 11.

Figure 4:
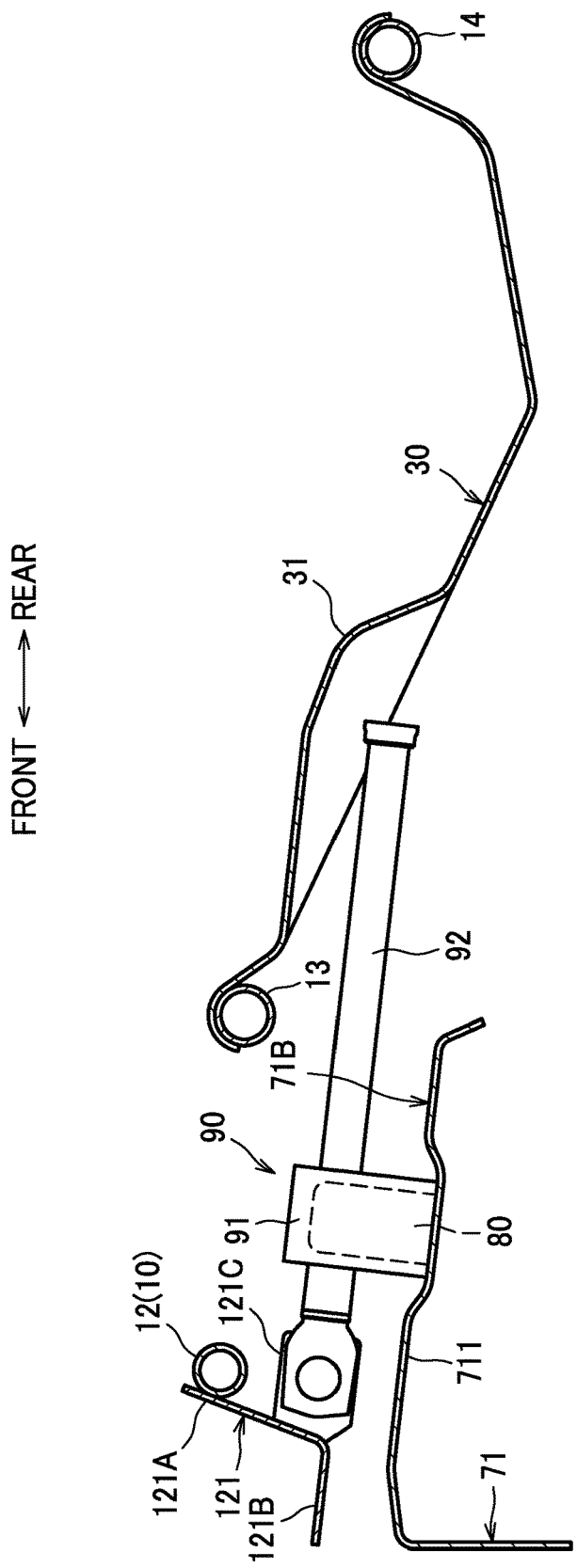
FIG. 4 is a sectional view of a first bracket, a first pipe frame, a second pipe frame, a third pipe frame, a pan frame, a drive source, a transmission mechanism, and a mount plate, as taken in a position shifted to the left side from the transmission mechanism.

A mount plate 121 is provided in a laterally central portion of the first pipe frame 12. As shown in FIG. 4, the mount plate 121 includes a fixed portion 121A disposed frontward of the first pipe frame 12, a clip support portion 121B extending from a lower end of the fixed portion 121A frontward, and a shaft mount portion 121C extending from the fixed portion 121A rearward under the first pipe frame 12. The fixed portion 121A of the mount portion 121 is welded to the first pipe frame 12. As shown in FIG. 3, a clip 121D on which an engageable wire 21 of the cushion pad 20 as will be described later is hooked to the clip support portion 121B of the mount plate 121.

The pan frame 30 is an elongate part made of sheet metal which has a longitudinal direction oriented in the front-rear direction. The pan frame 30 is fixed to the seat cushion frame 10. The pan frame 30 includes a front end portion placed on an upper side of the second pipe frame 13 and welded to the second pipe frame 13, and a rear end portion placed on an upper side of the third pipe frame 14 and welded to the third pipe frame 14.

The pan frame 30 has a lateral width smaller than a distance between the pair of side frames 11, and is disposed in a laterally central position inside the seat cushion frame 10.

The cushion pad 20 incorporates engageable wires 21 as an example of a wire, exterior-shaping wires 22, and a tuck-in wire 23. Each of the wires 21, 22, 23 is embedded in the cushion pad 20 by insert molding. In FIG. 4, for the sake of clarity, the exterior-shaping wires 22 are indicated by broken lines, and the tuck-in wire 23 is indicated by a chain double-dashed line.

The engageable wires 21 include three longitudinal wires 211, 212, 213 elongate in the front-rear direction; to be more specific, a first longitudinal wire 211 is disposed on a left side of the cushion pad 20 with respect to the laterally central position of the cushion pad 20, a second longitudinal wire 212 is disposed on a right side of the cushion pad 20 with respect to the laterally central position of the cushion pad 20, and a third longitudinal wire 213 is disposed on a right side of the second longitudinal wire 212. Front ends of the first longitudinal wire 211 and the second longitudinal wire 212 are connected by a transverse wire 215 that is so arranged as to extend in the lateral direction. The three longitudinal wires 211, 212, 213 are connected into an integral wire assembly via two connecting members 214 that are arranged one behind another.

Each of the longitudinal wires 211, 212, 213 includes a rear end portion having a hook 216 with which it is hooked on to the third pipe frame 14 of the seat cushion frame 10. Each longitudinal wire 211, 212, 213 is bent to have an upwardly-bulging segment provided in a portion thereof overlapping the second pipe frame 13.

A first engageable member 217A laid over the second pipe frame 13 is provided in a portion of the first longitudinal wire 211 overlapping the second pipe frame 13. In addition, a second engageable member 217B exposed at an undersurface of the cushion pad 20 and engageable with the first pipe frame 12 is provided in a portion of the first longitudinal wire 211 overlapping the first pipe frame 12.

Portions of the second longitudinal wire 212 and the third longitudinal wire 213 overlapping the second pipe frame 13 are connected via a third engageable member 217C that is so formed as to be laid over the second pipe frame 13. In addition, portions of the second longitudinal wire 212 and the third longitudinal wire 213 overlapping the first pipe frame 12 are connected via a fourth engageable member 217D that is so formed as to be exposed at the undersurface of the cushion pad 20 and engageable with the first pipe frame 12.

The transverse wire 215 includes a downwardly-bulging U-shaped bent portion 215A, which is provided in a mid-section of the transverse wire 215. A lower end portion of the bent portion 215A is exposed at the undersurface of the cushion pad 20 so that it is hooked on the clip 121D provided at the seat cushion frame 10.

When the cushion pad 20 including the engageable wires 21 as described above is mounted to the seat cushion frame 10, first of all, the rear end portion of the cushion pad 20 is brought close to the seat cushion frame 10 and the hooks 216 are hooked on to the third pipe frame 14. Then, the lower end portion of the bent portion 215A provided at the front end portion of the cushion pad 20 is fitted into the clip 121D. In this way, according to the present embodiment, the cushion pad 20 can be fixed to the seat cushion frame 10 in a simple and easy operation.

The exterior-shaping wires 22 are provided to keep the shape of the cushion pad 20, and arranged along the outside shape of the cushion pad 20.

The tuck-in wire 23 is provided to provide a tuck-in functionality for an end portion of the outer covering (not shown), which constitutes an outer surface of the cushion pad 20. To be more specific, the cushion pad 20 has a groove provided along the tuck-in wire 23. The tuck-in wire 23 is exposed to the outside at appropriate spots in the groove. The outer covering includes hook members provided to be hooked on the exposed tuck-in wire 23.

The drive source 80 and the transmission mechanism 90 are mechanisms for actuating the seat cushion frame 10.

Examples of the drive source 80 include a motor. As shown in FIG. 4, the drive source 80 is fixed on an upper side of the flat plate portion 711 of the connecting portion 71B of the first bracket 71. In other words, the drive source 80 is fixed to the floor via the first bracket 71 so as not to move relative to the floor. With this configuration in which the drive source 80 is fixed relative to the floor via the first bracket 71, no additional member for fixing the drive source 80 is required, so that increase in the number of parts can be suppressed. Moreover, since the first bracket 71 also serves to support the pair of rails 50, the pair of rails 50 and the drive source 80 can be fixed to the floor using a single part; thus, increase in the number of parts can be suppressed as well. In FIG. 4, for the sake of clarity, illustration of the side frames 11, the rails 50 and the sliders 60 is omitted.

The transmission mechanism 90 is configured to receive a driving force from the drive source 80 and to cause the seat cushion frame 10 to move in the front-rear direction. The transmission mechanism 90 mainly includes a gearbox 91 and a screw shaft 92.

The gearbox 91 is a member that houses gears for reducing the speed with which a rotary driving force generated in the drive source 80 is transmitted to the screw shaft 92, and a nut engaging with the screw shaft 92. The gearbox 91 is disposed on the left side of the drive source 80, and fixed on the upper side of the flat plate portion 711 of the connecting portion 71B of the first bracket 71.

The gearbox 91 is disposed in a laterally central position inside the seat cushion frame 10 (see FIG. 3).

The gearbox 91 is disposed such that an upper end thereof is in a position lower than the second pipe frame 13. With this arrangement, interference of the gearbox 91 with the second pipe frame 13 which would otherwise occur when the seat cushion frame 10 slides in the front-rear direction can be made less likely to occur.

The screw shaft 92 is disposed to extend out through the gearbox 91 in the front-rear direction. This screw shaft 92 is configured to move in the front-rear direction when driven by the drive source 80. This screw shaft 92 has a front end portion fixed to the mount plate 121 fixed to the first pipe frame 12. To be more specific, the front end portion of the screw shaft 92 is fixed using a bolt fastened to the shaft mount portion 121C of the mount plate 121. In this way, the screw shaft 92 is connected to the seat cushion frame 10.

The rear end portion of the screw shaft 92 is disposed in a position rearward of the position of the second pipe frame 13.

Hereinafter, the structure of the pan frame 30 is described.

The pan frame 30 generally has a downwardly-depressed shape such that a portion thereof disposed between the second pipe frame 13 and the third pipe frame 14 is in a position lower than those of the second pipe frame 13 and the third pipe frame 14. With this configuration, the cushion pad 20 laid on the pan frame 30 can be made thicker, so that the comfort of an occupant can be improved.

The pan frame 30 includes a front end portion overlapping the rear end portion of the screw shaft 92 in an upward-downward direction. This pan frame 30 has an undersurface of which a portion lying over the transmission mechanism 90 (screw shaft 92) is recessed upward. In other words, the pan frame 30 includes in its front end portion a bulging portion 31 that is so formed as to bulge upward through plastic deformation effected in the pan frame 30.

With this configuration, the rear end portion of the screw shaft 92 can be arranged in a space under the bulging portion 31; therefore, the screw shaft 92 longer in length can be provided, and the pan frame 30 can be arranged to extend up to some frontwardly extended range. Since the pan frame 30 is disposed above the rear end portion of the screw shaft 92, the cushion pad 20 when weighted down with the occupant's weight would not come in contact with the screw shaft 92 and rather be supported by the pan frame 30, so that the occupant can be kept unlikely to feel uncomfortable. Furthermore, since the bulging portion 31 is provided in the laterally central position inside the seat cushion frame 10 (i.e., corresponding to a portion between the thighs of the occupant), the occupant can be kept unlikely to feel uncomfortable even if the cushion pad 20 is designed to be thinner in this portion.

Next, a description is given of a detailed structure of the support frame 74 and the right side frame 11.

Figure 5:
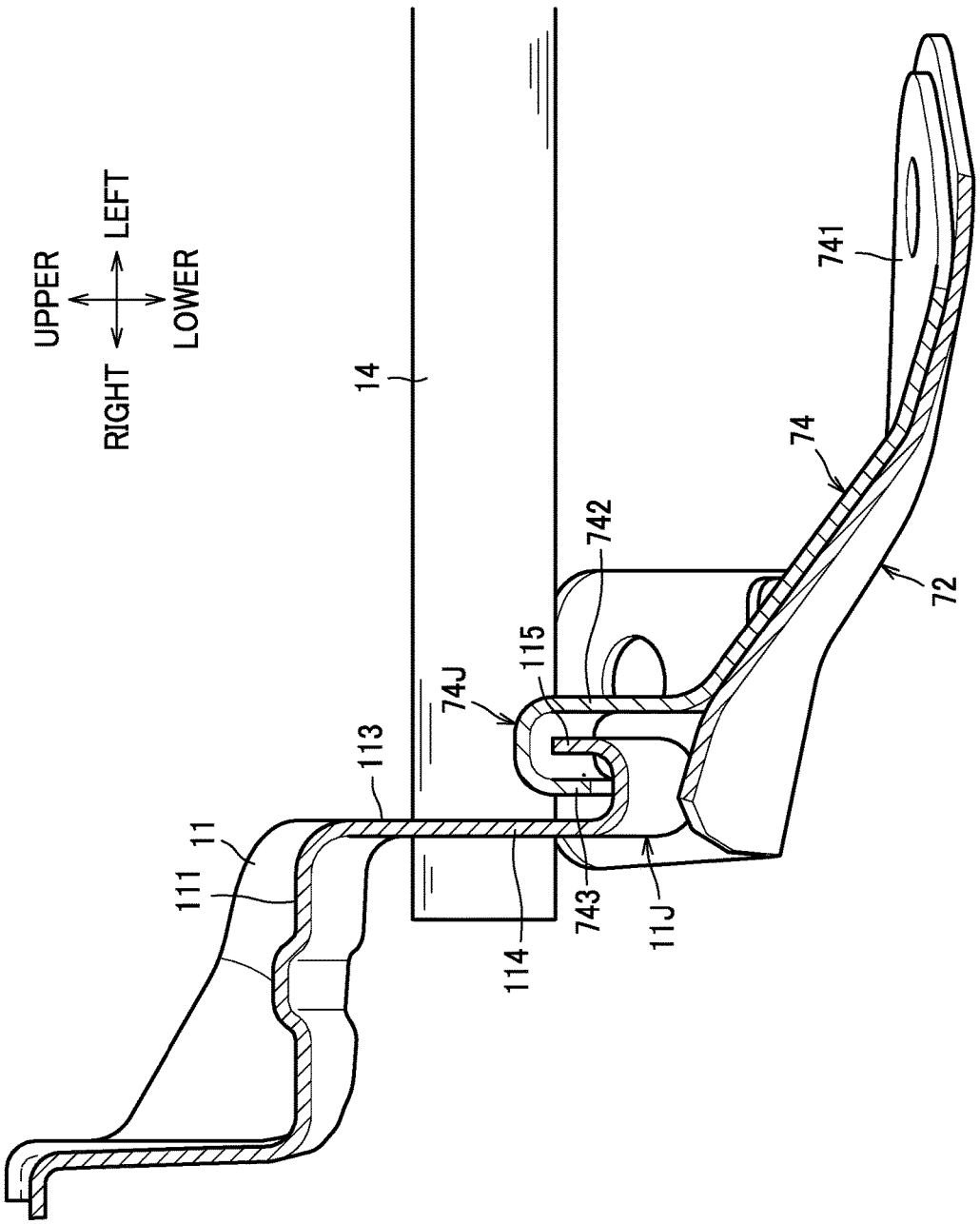
FIG. 5 is a sectional view of a side frame, a second bracket, and a support frame, as taken in a plane passing through a first engageable portion and a second engageable portion.

As shown in FIG. 5, the support frame 74 is fixed to the second bracket 72 in a position on the left side with respect to the position of the right side frame 11. The support frame 74 includes a first engageable portion 74J that is an elongate member having a substantially J-shaped cross section protruding from the second bracket 72 upward and then so extending as to have a distal end facing downward, and its longitudinal direction oriented in the front-rear direction (see also FIG. 3).

To be more specific, the support frame 74 includes a fixed portion 741 fixed to the second bracket 72, a first extension portion 742 extending from the fixed portion 741 upward, and a first claw portion 743 extending from the first extension portion 742 rightward and then extending downward.

The right side frame 11 includes a second engageable portion 11J extending further from the second side wall portion 113 downward, which second engageable portion 11J is an elongate member having its longitudinal direction oriented in the front-rear direction (see also FIG. 3). This second engageable portion 11J is configured to extend so as to have a distal end facing upward, and is configured to be engageable with the first engageable portion 74J in the upward-downward direction.

To be more specific, the right side frame 11 includes a second extension portion 114 extending from the rear end portion of the second side wall portion 113 downward, and a second claw portion 115 extending from the second extension portion 114 leftward under the first claw portion 743 and then extending upward.

Because of the provision of the first engageable portion 74J and the second engageable portion 11J configured as described above, upward motion of the seat cushion frame 10, which would be caused in a collision of the automobile or on other occasions, results in engagement of the first engageable portion 74J with the second engageable portion 11J, thus making it possible to restrain the seat cushion frame 10 from moving upward.

Operation of the left seat S2 configured as described above is described hereafter.

In normal times, as shown in FIG. 1, the seat cushion S21 of the left seat S2 is in a state with its front end aligned with that of the seat cushion S11 of the center seat S1. In this state, the seat cushion frame 10 is, as shown in FIG. 3, in a state where it is in the rearmost position.

When the drive source 80 is actuated by an operation of an occupant or otherwise and causes the screw shaft 92 to move frontward, the seat cushion frame 10 is pushed frontward by the screw shaft 92. Accordingly, the seat cushion frame 10 slides frontward relative to the floor with the sliders 60 being guided by the rails 50. At that time, the second engageable portion 11J of the right side frame 11 moves along the first engageable portion 74J of the support frame 74.

In the present embodiment, the drive source 80 is fixed relative to the floor; therefore, a member which is caused to slide by actuation of the drive source 80 can be made lightweight in comparison with an alternative configuration in which the drive source 80 is fixed to the seat cushion frame 10 or any other member which moves together with the seat cushion frame 10. As a result, a load imposed on the drive source 80 when the seat cushion frame 10 is caused to slide can be reduced.

Since the pan frame 30 has an under surface of which a portion disposed in a lateral position corresponding to the transmission mechanism 90 is recessed upward, interference of the gear box 91 with the pan frame 30 which would otherwise occur when the seat cushion frame 10 slides frontward can be made less likely to occur.

In a state where the seat cushion frame 10 is in a frontwardly moved position, when the drive source 80 is activated to cause the screw shaft 92 to move rearward, the seat cushion frame 10 is pulled by the screw shaft 92 rearward. This causes the seat cushion frame 10 to slide rearward relative to the floor while allowing the sliders 60 to be guided by the rails 50. As a result, as shown in FIG. 1, the seat cushion S21 of the left seat S2 is moved back to its original position.

Although the first embodiment has been described above, the present invention is not limited to the above-described embodiment. Specific configurations may be modified where appropriate without departing from the gist of the present invention.

In the above-described embodiment, the drive source 80 is fixed to the first bracket 71 to thereby be fixed relative to the floor, but the arrangement of the drive source is not limited thereto. For example, the drive source 80 may be fixed to a bracket provided separately from the first bracket and fixed to the floor, or may be fixed directly to the floor. The pair of rails 50 may also be fixed directly to the floor without using the first bracket.

Figure 6:
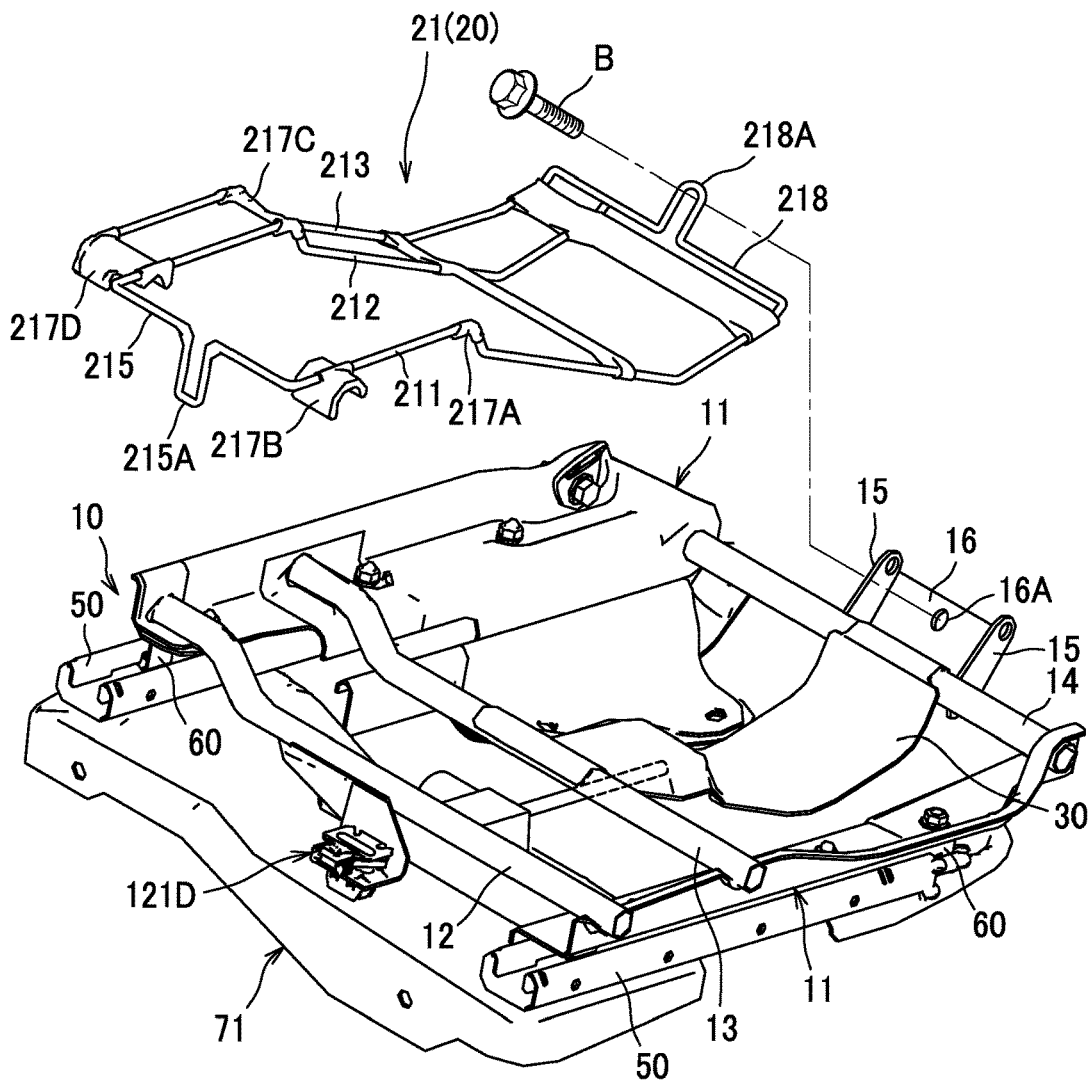
FIG. 6 is an exploded perspective view showing a modified example of an engageable wire and a seat frame.

In the above-described embodiment, the engageable wire(s) 21 includes a hook 216 to be hooked on the third pipe frame 14, but the arrangement for fixing the cushion pad 20 to the seat cushion frame 10 is not limited thereto. For example, as shown in FIG. 6, the engageable wire(s) 21 may be fixed to the seat cushion frame 10 using a bolt B.

Specifically, the seat cushion frame 10 includes a pair of left and right link pieces 15 fixed to the third pipe frame 14, and a mount wall 16 connecting the pair of link pieces 15.

The pair of link pieces 15 extend from the third pipe frame 14 in an obliquely-rearward-and-upward direction. The mount wall 16 is made of sheet metal, and is welded to the pair of link pieces 15. The mount wall 16 has an opening 16A formed in its center.

The engageable wire 21 includes no such hook 21G as in the above-described embodiment, but instead includes a rear end connecting wire 218 connecting rear ends of the three longitudinal wires 211, 212, 213. The rear end connecting wire 218 includes a rear end bent portion 218A provided in a laterally central portion thereof, which rear end bent portion 218A is bent to have a U-shaped configuration bulging in an obliquely-rearward-and-upward direction.

The engageable wire 21 configured as described above is fixed to the seat cushion frame 10 by screwing the bolt B passed through the rear bent portion 218A, into the opening 16A of the mount wall 16.

In the above-described embodiment, the first bracket 71 and the second bracket 72 are configured as separate parts, but the configurations of the first bracket and the second bracket are not limited thereto; the first bracket and the second bracket may be configured as a single integral part.

In the above-described embodiment, the second bracket 72 and the support frame 74 are configured as separate parts, but the configuration of the support frame is not limited thereto. For example, the second bracket and the support frame may be configured as a single integral part; that is, the second bracket may be configured as a support frame including a first engageable portion.

Figure 7:
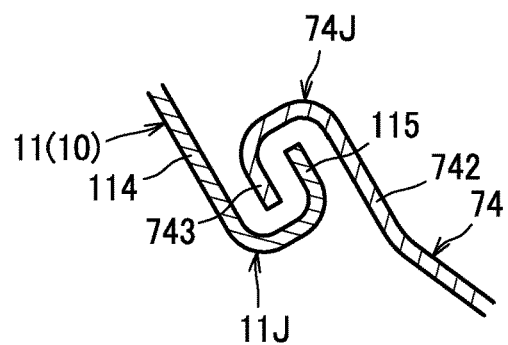
FIG. 7 is a sectional view showing a modified example of the first engageable portion and the second engageable portion.

As shown in FIG. 7, the distal end portion of the second engageable portion 11J may be inclined toward the proximal end portion of the second engageable portion 11J with respect to the vertical direction, and the distal end portion of the first engageable portion 74J may be inclined to a direction away from the proximal end portion of the second engageable portion 11J with respect to the vertical direction (i.e., the distal end portions of the first engageable portion 74J and the second engageable portion 11J extending in the upward-downward directions opposite to each other and overlapping each other may be inclined toward the second extension portion 114). With this configuration, when the second engageable portion 11J tends to move upward, a load between the second engageable portion 11J and the first engageable portion 74J is imposed in such a direction that the second engageable portion 11J and the first engageable portion 74J are unlikely to get disengaged from each other. Therefore, the second engageable portion 11J can be prevented from getting disengaged from the first engageable portion 74J.

In the above-described embodiment, a pair of rails 50 and a pair of sliders 60 are provided in a unit, but the configuration of the vehicle seat is not limited thereto. For example the vehicle seat may include two or more units each consisting of one pair of rails and one pair of sliders.

Next, referring mainly to FIGS. 8 to 12, a second embodiment is described.

Figure 8:
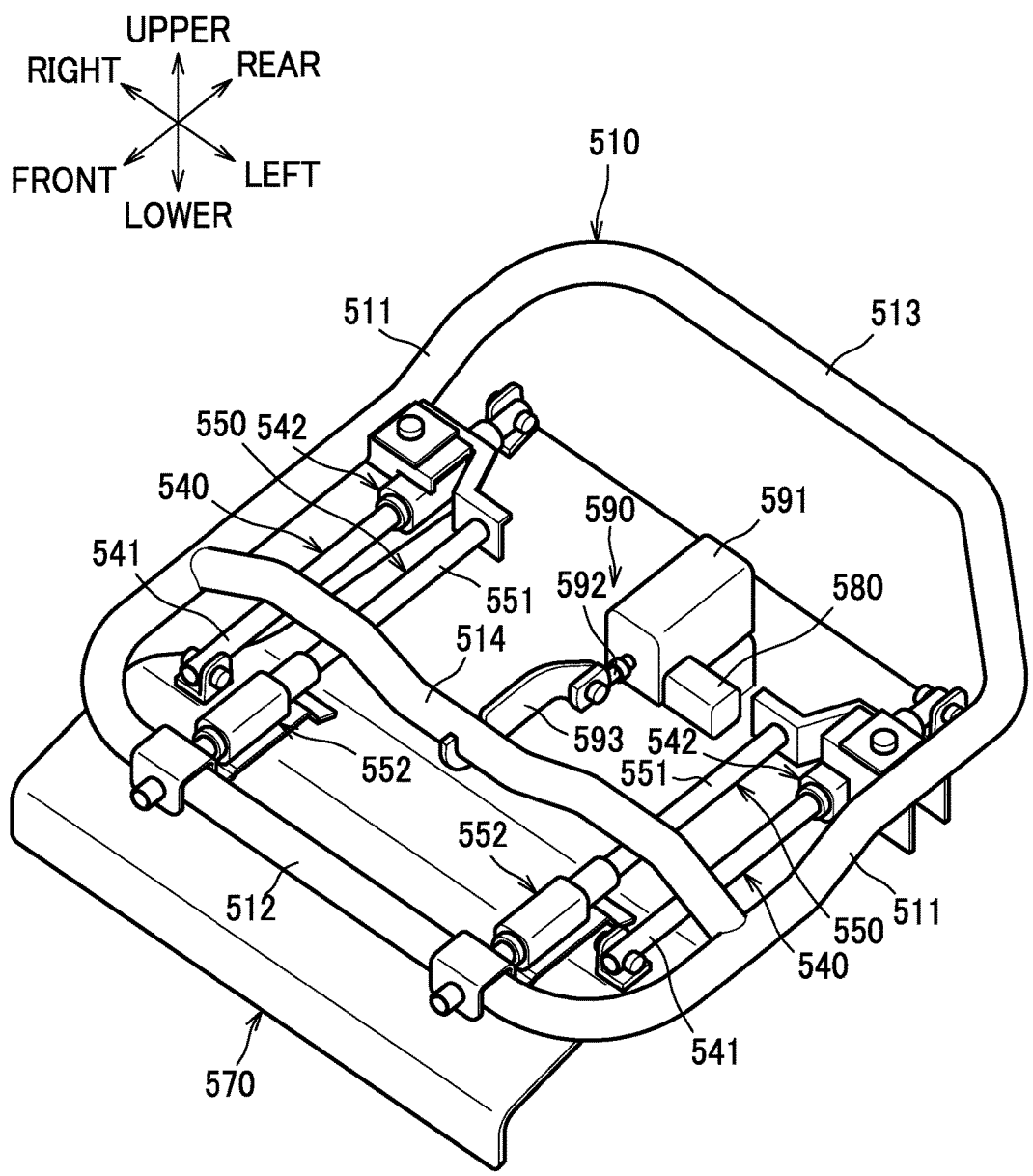
FIG. 8 is a perspective view showing a seat cushion frame, a base frame, a drive source, a transmission mechanism, and a slide mechanism.

In the second embodiment, as shown in FIG. 8, the left seat S2 mainly includes a seat cushion frame 510 and elements disposed under the seat cushion frame 510 which include a base frame 570 as an example of a base portion, a drive source 580, a transmission mechanism 590, and an outer slide mechanism 540 and an inner slide mechanism 550 as an example of a slide mechanism, which outer and inner slide mechanisms 540, 550 are disposed over the base frame 570.

The seat cushion frame 510 is made of a metal pipe. The seat cushion frame 510 includes a pair of side frames 511 which extends in the front-rear direction and constitutes left and right frames of the seat cushion S21, a front frame 512 connecting front end portions of the pair of side frames 511, a rear frame 513 connecting rear end portions of the pair of side frames 511, and a cross member 514 connecting the pair of side frames 511 at their positions between the front frame 512 and the rear frame 514.

In the present embodiment, the seat cushion frame 510 is configured such that the side frames 511 have rear portions bent upward and the rear frame 513 has an upwardly recessed shape beyond the front frame 512, in order that the seat cushion frame 510 actuated to move frontward can avoid interfering with the vehicle body or the slide mechanisms 540, 550 or other components. In other words, the seat cushion frame 510 is shaped to have its front portion positioned close to the vehicle body to such an extent that it does not interfere with the vehicle body or the slide mechanisms 540, 550, or other components.

Figure 9:
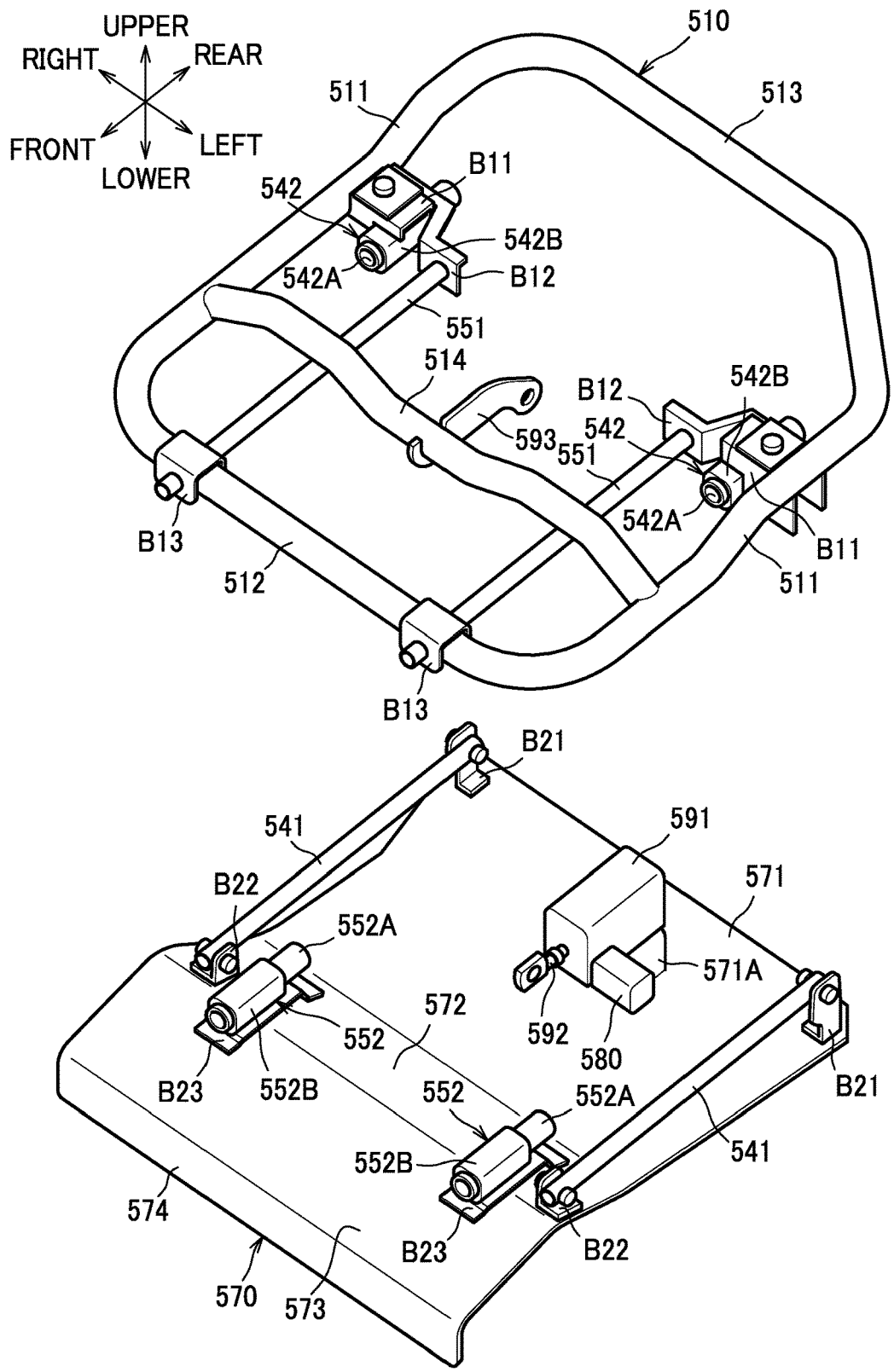
FIG. 9 is an exploded perspective view showing the seat cushion frame, the base frame, the drive source, the transmission mechanism, and the slide mechanism.

The base frame 570 is made of sheet metal, and bent to conform to the shape of the vehicle body. As shown in FIG. 9, the base frame 570 according to the present embodiment is configured generally to ascend frontward, and includes a first portion 571 gently inclined to lead up to a higher position toward frontward, a second portion 572 extending from the front end of the first portion 571 at an inclination steeper than that of the first portion 571 toward frontward, a third portion 573 extending substantially horizontally from the front end of the second portion 572 toward frontward, and a fourth portion 574 extending downward from the front end of the third portion 573 (see also FIG. 11(a)).

The drive source 580 and the transmission mechanism 590 are mechanisms for actuating the seat cushion frame 510. The drive source 580 is configured, for example, as a motor. The transmission mechanism 590 is configured to receive a driving force from the drive source 580 and to cause the seat cushion frame 510 to move in the front-rear direction. The transmission mechanism 590 mainly includes a gearbox 591, a screw shaft 592 and a link member 593, and is fixed to the base frame 570.

The gearbox 591 is a member that houses gears for reducing the speed with which a rotary driving force generated in the drive source 580 is transmitted to the screw shaft 592, and a nut engaging with the screw shaft 592. The gearbox 591 is disposed in a laterally central position inside the base frame 570.

Figure 10:
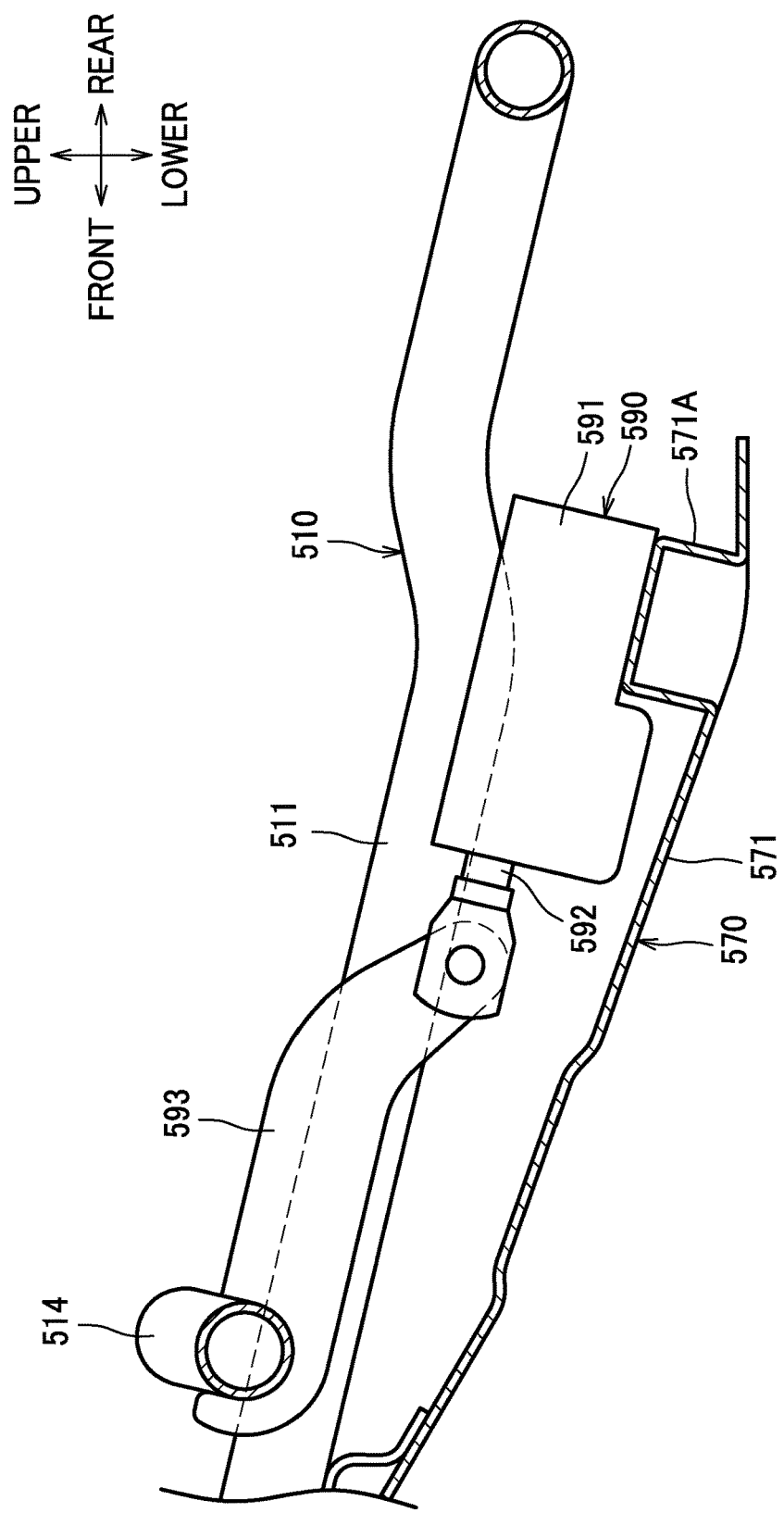
FIG. 10 is a sectional view showing relative positions of the transmission mechanism and the side frame.

The gearbox 591 is, as shown in FIG. 10, fixed on an upper side of a seating portion 571A formed in the first portion 571 of the base frame 570, and thus disposed in a position higher than that of an upper surface of the first portion 571. In the present embodiment, the seating portion 571A consists of a protruded portion protruding upward from the first portion 571, which protruded portion is provided by drawing the base frame 570. In FIG. 10, for the sake of clarity, illustration of the outer slide mechanism 540 and the inner slide mechanism 550 is omitted.

The screw shaft 592 is disposed to extend in the front-rear direction and protrudes from the gearbox 591 frontward. The screw shaft 592 is configured to move in the front-rear direction when driven by the drive source 580. Since the gearbox 591 is arranged in the position higher than that of the first portion 571, the screw shaft 592 is made unlikely to interfere with the second portion 572 or other components of the base frame 570 when the screw shaft 592 protrudes frontward.

As shown in FIG. 8, the screw shaft 592 is disposed in a center between the pair of side frames 511. With this configuration, even if a portion of the cushion material with which the screw shaft 592 is covered is made thinner due to the higher position of the screw shaft 592, an occupant is less likely to feel uncomfortable because the center between the pair of side frames 511 is a portion with which the buttocks of the occupant will not contact.

This screw shaft 592 is connected to the seat cushion frame 510 by being fixed to the link member 593 as an example of an actuator, which is fixed to the seat cushion frame 510.

The link member 593 is a member (actuator) by which a driving force transmitted from the drive source 580 through the transmission mechanism 590 is conveyed to the seat cushion frame 510 side in order to cause the seat cushion frame 510 to move in the front-rear direction relative to the base frame 570. The link member 593 extends in the front-rear direction with a rear end portion thereof bolted or otherwise fixed to the front end portion of the screw shaft 592, and a front end portion thereof welded or otherwise fixed to the cross member 514 of the seat cushion frame 510.

In the transmission mechanism 590 configured as described above, in the state where the seat cushion frame 510 is in the rearmost position, as shown in FIG. 10, part of the gearbox 591, part of the screw shaft 592 and part of the link member 593 are located to overlap the side frame 511 when viewed from the left or right. Furthermore, the gearbox 591 and the screw shaft 592 are provided so as not to protrude from the side frame 511 upward when viewed from the left or right.

As shown in FIG. 8, the outer slide mechanism 540 and the inner slide mechanism 550 are members which guide the movement of the seat cushion frame 510 in the front-rear direction, respectively. Two outer slide mechanisms 540 are provided of which one is disposed on the left side of the drive source 580 (and the transmission mechanism 590) and another is disposed on the right side of the drive source 580 (and the transmission mechanism 590). Of two inner slide mechanisms 550 provided between the two outer slide mechanisms 540, one is disposed on the left side of the drive source 580 (and the transmission mechanism 590) and another is disposed on the right side of the drive source 580 (and the transmission mechanism 590). In other words, the slide mechanisms 540, 550 are provided in pairs at the left and at the right. Provision of pairs of the slide mechanisms 540, 550 at the left and at the right makes it possible to support the load imposed from the occupant on the seat cushion frame 510 in a distributed manner, and thus serves to suppress the deformation of the slide mechanisms 540, 550.

It is understood that the cross member 514 crossing over the outer slide mechanism 540 and the inner slide mechanism 550 may be bent to have an upwardly-bulging portion provided over the outer slide mechanism 540 and the inner slide mechanism 550 in order to avoid interference with the outer slide mechanism 540 and the inner slide mechanism 550.

The outer slide mechanism 540 includes an outer guide shaft 41 as an example of a guide shaft, extending in the front-rear direction, and an outer slide member 542 as an example of a slide member, configured to be movable along the outer guide shaft 541 relative to the outer guide shaft 541. The inner slide mechanism 550 includes an inner guide shaft 551 as an example of a guide shaft, extending in the front-rear direction, and an inner slide member 552 as an example of a slide member, configured to be movable along the inner guide shaft 551 relative to the inner guide shaft 551.

In the left or right pair of slide mechanisms 540, 550, the inner guide shaft 551 is provided in a position shifted to the front relative to the outer guide shaft 541; thus, the two guide shafts 541, 551 are disposed in positions shifted in the front-rear direction. With this arrangement of the two guide shafts 541, 551, the guide shafts 541, 551 can be arranged to conform to the shape of the vehicle body more flexibly in comparison with an alternative configuration in which a single long guide shaft is provided.

In the left or right pair of slide mechanisms 540, 550, the inner slide member 552 is provided in a position frontward of a position of the outer slide member 542, and the two slide members 542, 552 are disposed separate from each other in the front-rear direction.

Moreover, in order to downsize the left seat S2, all the guide shafts 541, 551 are disposed between the pair of side frames 511 when viewed from above or below.

As shown in FIG. 9, the outer slide mechanism 540 is provided to support the rear portion of the seat cushion frame 510; the outer guide shafts 541 are fixed to the base frame 570 via the first brackets B21 and the second brackets B22, while the outer slide members 542 (rear slide members) are fixed to the rear portion of the seat cushion frame 510 via the third brackets B11.

The outer guide shafts 541 are each configured as a metal rod, and extend from a position in which they overlap the rear end portion of the first portion 571 of the base frame 570 to a position in which they overlap the second portion 572 of the base frame 570, when viewed from above or from below. The first brackets B21 are fixed to the rear end portion of the first portion 571 of the base frame 570, and configured to support the rear end portions of the outer guide shafts 541. The second brackets B22 are fixed to the second portion 572 of the base frame 570 and configured to support the front end portions of the outer guide shafts 541.

The outer slide members 542 extend in the front-rear direction, and are each configured to include a plastic tube 542A inside of which the outer guide shaft 541 is disposed, and a metal sheath 542B provided to cover the outer periphery of the tube 542A. The third brackets B11 are fixed to the rear portions of the side frames 511. The outer slide members 542 are each supported by the third bracket B11 with the sheath 542B welded or otherwise fixed to the third bracket B11.

In this outer slide mechanism 540, when the seat cushion frame 510 is in the rearmost position, the outer slide members 542 are positioned at the rear portions of the outer guide shafts 541 (see FIG. 8). The outer slide members 542 are configured to be movable together with the seat cushion frame 510 along the outer guide shafts 541 in the front-rear direction.

The inner slide mechanism 550 is provided to support the front portion of the seat cushion frame 510; the inner guide shafts 551 are fixed to the seat cushion frame 510 via the fourth brackets B12 and the fifth brackets B13, while the inner slide members 552 (front slide members) are fixed to the base frame 570 via the sixth brackets B23.

The inner guide shafts 551 are each configured as a metal rod, and extend from a position in which they are adjacent to laterally inner sides of the outer slide members 542 to a position in which they protrude frontward slightly beyond the front frame 512. It is to be understood that the inner guide shafts 551 may be provided so as not to protrude frontward beyond the front frame 512. The fourth brackets B12 are connected to the third brackets B11 using bolts fastened thereto, and thus fixed to the side frames 511 via the third brackets B11. The fourth brackets B12 are configured to support the rear end portions of the inner guide shafts 551. The fifth brackets B13 are welded or otherwise fixed to the front frame 512, and configured to support the front end portions of the inner guide shafts 551.

The inner slide members 552 extend in the front-rear direction, and are each configured to include a plastic tube 552A inside of which the inner guide shaft 551 is disposed, and a metal sheath 552B provided to cover the outer periphery of the tube 552A. The sixth brackets B23 are fixed to the base frame 570 at positions thereof corresponding to the position of the front portion of the seat cushion frame 510 that has been moved to the rearmost position (see FIG. 8). To be more specific, the sixth brackets B23 are provided astride the border between the second portion 572 and the third portion 573 of the base frame 570. The inner slide members 552 are supported by the sixth brackets B23 with the sheaths 552B welded or otherwise fixed to the sixth brackets B23.

In this inner slide mechanism 550, as shown in FIG. 8, when the seat cushion frame 510 is in the rearmost position, the inner guide shafts 551 are in a position in which they have been moved to the rearmost position relative to the inner slide members 552, i.e., the inner slide members 552 are positioned at the front portions of the inner guide shafts 551. The inner guide shafts 551 are configured to be movable together with the seat cushion frame 510 relative to the inner slide members 552 frontward and rearward.

As shown in FIG. 11(a), the outer guide shaft 541 and the inner guide shaft 551 are arranged to ascend frontward in accordance with the inclination of the base frame 570.

As the outer guide shaft 541 and the inner guide shaft 551 are arranged to conform to the shape of the vehicle body, in the present embodiment, the inner guide shaft 551 is in a position shifted upwardly from a position of the outer guide shaft 541. In other words, a pair of the slide mechanisms 540, 550 includes two guide shafts 541, 551 of which portions coextensive in the front-rear direction are disposed in positions shifted from each other in the upward-downward direction.

As shown in FIG. 11(b), when the seat cushion frame 510 is in the rearmost position, part of the outer guide shaft 541 overlaps the side frame 511 as viewed from a left or right direction. Similarly, as shown in FIG. 12(b), when the seat cushion frame 510 has been moved to the front relative to the position shown in FIG. 11(b), part of the outer guide shaft 541 overlaps the side frame 511 as viewed from the left or right direction.

As shown in FIG. 11(a), when the seat cushion frame 510 is in the rearmost position, part of the inner guide shaft 551 overlaps the side frame 511 as viewed from the left or right direction. Similarly, as shown in FIG. 12(a), when the seat cushion frame 510 has been moved to the front relative to the position shown in FIG. 11(a), part of the inner guide shaft 551 overlaps the side frame 511 as viewed from the left or right direction.

In this way, according to the present embodiment, the seat cushion frame 510 is provided in a position close to the vehicle body such that the guide shafts 541, 551 overlap the side frame 511 as viewed in the left or right direction; therefore, the cushion material with which the seat cushion frame 510 is covered can be made thick enough. Accordingly, the comfort of the occupant can be improved.

Moreover, in the present embodiment, the seat cushion frame 510 including the side frames 511 is made of pipe; therefore, the thickness of the seat cushion frame 510 can be reduced while keeping its rigidity more effectively in comparison with an alternative configuration in which the side frames are made of sheet metal. Consequently, the cushion material with which the seat cushion frame 510 is covered can be configured to have an adequate thickness, so that the comfort of an occupant can be improved more.

Next, the operation of the left seat S2 is described.

As describe in FIG. 1, in normal times, the seat cushion S21 of the left seat S2 is so positioned as to have its front end aligned with the front end of the seat cushion S11 of the center seat S1. At this time, the seat cushion frame 510 is, as shown in FIG. 8, in the rearmost position.

When the drive source 580 is operated by an occupant or otherwise driven to cause the screw shaft 592 to move frontward, the seat cushion frame 510 is pushed frontward by the link member 593. The seat cushion frame 510 is thereby slid relative to the base frame 570 in an obliquely-frontward-and-upward direction while being guided by the outer slide mechanism 540 and the inner slide mechanism 550. As a result, as shown in FIG. 2, the seat cushion S21 of the left seat S2 shifts its position and protrudes frontward farther than the seat cushion S11 of the center seat S1.

In the outer slide mechanism 540, when the seat cushion frame 510 is pushed frontward, the outer slide members 542 fixed to the rear portion of the seat cushion frame 510 are, as shown in FIG. 12(b), moved frontward along the outer guide shafts 541 from the rear portions of the outer guide shafts 541 fixed to the base frame 570 as shown in FIG. 11(b).

In the present embodiment, the outer slide members 542 for supporting the rear portion of the seat cushion frame 510 are fixed to the seat cushion frame 510; therefore, the outer guide shafts 541 may be so arranged as to extend from the position corresponding to the rear portion of the seat cushion frame 510 in the base frame 570 frontward. With this arrangement, the outer guide shafts 541 do not have to be so arranged as to protrude rearward beyond the seat cushion frame 510 in the rearmost position, so that the left seat S2 can be made compact.

In the inner slide mechanism 550, on the other hand, when the seat cushion frame 510 is pushed frontward, the inner slide members 552 located in a position corresponding to the front portion of the seat cushion frame 510 and fixed to the base frame 570 are, as shown in FIG. 12(a), moved rearward relative to the inner guide shafts 551 from the front portions of the inner guide shafts 551 as shown in FIG. 11(a).

In the present embodiment, the inner slide members 552 supporting the front portion of the seat cushion frame 510 are fixed to the base frame 570; therefore, the inner guide shafts 551 may be so arranged as to extend from the front end of the seat cushion frame 510 rearward. With this arrangement, the inner guide shafts 551 do not have to be so arranged as to protrude frontward beyond the seat cushion frame 510, so that the left seat S2 can be made compact.

Thereafter, from the states shown in FIGS. 12(a), (b), when the drive source 580 is driven to cause the screw shaft 592 to retract rearward, the seat cushion frame 510 is pulled rearward by the link member 593. The seat cushion frame 510 is thereby slid relative to the base frame 570 in an obliquely-rearward-and-downward direction as shown in FIGS. 11(a), (b) while being guided by the outer slide mechanism 540 and the inner slide mechanism 550. As a result, as shown in FIG. 1, the seat cushion S21 of the left seat S2 is moved back to its original position.

Although the second embodiment has been described above, the present invention is not limited to the above-described embodiment. Specific configurations may be modified where appropriate without departing from the gist of the present invention.

In the second embodiment, the left or right pair of the slide mechanisms 540, 550 includes two guide shafts 541, 551 of which portions coextensive in the front-rear direction are disposed in positions shifted from each other in the upward-downward direction, but the arrangement of the guide shafts is not limited thereto. For example, a pair of slide mechanisms may include two guide shafts of which portions coextensive in the front-rear direction are disposed at a same height. With this configuration, the seat cushion frame 510 can be provided in a lower position in comparison with an alternative configuration in which the two guide shafts are disposed in positions shifted from each other in the upward-downward direction.

In the second embodiment, all the guide shafts 541, 551 are disposed between the pair of side frames 511 when viewed from above or below, but the arrangement of the guide shafts is not limited thereto. For example, the outer guide shafts may be arranged at the outer sides of the pair of side frames 511.

In the second embodiment, part of each guide shaft 541, 551 is so provided as to overlap the side frame 511 as viewed from the left or right direction, but an alternative configuration may be feasible for example such that when the seat cushion frame 510 is in the rearmost position, the entire guide shaft overlaps the side frame 511 as viewed from the left or right direction.

In the second embodiment, the guide shafts 541, 551 are each configured as a metal rod, but the guide shafts may, for example, be configured as a round or rectangular pipe, or as a plate-shaped member having a U-shaped cross section. The material for the guide shafts may preferably be metal but may be plastic, instead.

In the first and second embodiments, the left seat S2 includes the drive source 80, 580 and the transmission mechanism 90, 590, and is configured such that a driving force transmitted from the drive source 80, 580 via the transmission mechanism 90, 590 is used to actuate the seat cushion frame 10, 510, but the configuration of the drive source is not limited thereto. The drive source and/or the transmission mechanism may be provided separately from the left seat S2. The drive source may not employ a motor to electrically actuate the seat cushion frame 10, 510, but may use a hand-operated rotary handle to allow the screw shaft 92, 592 to be manipulated or otherwise provide manual operation means to actuate the seat cushion frame 10, 570.

In the first and the second embodiments, the base portion is exemplified by the base frame 70, 570, but the base portion may be embodied in the vehicle body.

In the above-described embodiments, the seat for use in the rear seat of an automobile is illustrated as an example of a seat to which the present invention is applicable, but the present invention is not limited thereto. For example, the resent invention is also applicable to a seat for use in the driver's seat or the passenger seat next to the driver's seat. Furthermore, the present invention may be applicable to a seat for use in any vehicles other than an automobile, such as rail cars, ships and aircrafts, etc.

The invention claimed is:

1. A vehicle seat comprising:
    a seat cushion frame;
    a slide mechanism including a guide member extending in a front-rear direction and a slide member movable along the guide member relative to the guide member, the seat cushion frame being fixed to one of the guide member and the slide member, another of the guide member and the slide member being fixed to a floor of a vehicle;
    a drive source;
    a transmission mechanism configured to receive a driving force from the drive source and to cause the seat cushion frame to move in the front-rear direction;
    a bracket fixed to the floor; and
    a support frame fixed to the bracket,
    wherein the drive source is fixed to the floor,
    wherein the guide member includes a pair of rails fixed to the floor,
    wherein the bracket is configured to support the rails,
    wherein the slide member includes a pair of sliders engageable with the pair of rails and slidable relative to the pair of rails,
    wherein the seat cushion frame is fixed to the pair of sliders,
    wherein the support frame includes a first engageable portion so extending as to have a distal end facing downward,
    wherein the seat cushion frame includes a pair of left and right side frames, and
    wherein the side frames include a second engageable portion so extending as to have a distal end facing upward, the second engageable portion being engageable with the first engageable portion in an upward-downward direction.

2. The vehicle seat according to claim 1, further comprising an another bracket connecting the pair of rails,
    wherein the drive source is fixed to the another bracket.

3. The vehicle seat according to claim 2, wherein another bracket is fixed to the floor.

4. The vehicle seat according to claim 1, wherein a distal end portion of the second engageable portion is inclined toward a proximal end portion of the second engageable portion with respect to a vertical direction, and a distal end portion of the first engageable portion is inclined to a direction away from the proximal end portion of the second engageable portion with respect to the vertical direction.

5. The vehicle seat according to claim 1, further comprising a cushion pad with which the seat cushion frame is covered,
    wherein the cushion pad includes a wire having a hook with which the wire is hooked on to the seat cushion frame.

6. The vehicle seat according to claim 1, wherein the seat cushion frame includes a pair of left and right side frames, and a pipe frame connecting the pair of side frames,
    wherein the side frames are made of sheet metal, and
    wherein the pipe frame includes left and right end portions placed on upper surfaces of the side frames and welded to the side frames.

7. The vehicle seat according to claim 1, further comprising a pan frame fixed to the seat cushion frame, wherein the pan frame has an undersurface of which a portion lying over the transmission mechanism is recessed upward.

8. The vehicle seat according to claim 1, further comprising a base portion fixed to the floor,
    wherein the seat cushion frame includes a pair of left and right side frames,
    wherein the guide member includes a guide shaft, wherein the guide shaft or the slide member is fixed to the base portion, and wherein at least part of the guide shaft overlaps the side frames as viewed from a left or right direction.

9. The vehicle seat according to claim 8, wherein the slide mechanism includes two pairs of slide mechanisms, one pair being disposed at a left side, and another pair at a right side.

10. The vehicle seat according to claim 9, wherein a pair of the slide mechanisms includes two guide shafts disposed in positions shifted in the front-rear direction.

11. The vehicle seat according to claim 9, wherein a pair of the slide mechanisms includes two guide shafts of which portions coextensive in the front-rear direction are disposed at a same height.

12. The vehicle seat according to claim 9, wherein a pair of the slide mechanisms includes two guide shafts of which portions coextensive in the front-rear direction are disposed in positions shifted from each other in an upward-downward direction.

13. The vehicle seat according to claim 9, wherein a pair of the slide mechanisms includes two slide members which are disposed in positions separate from each other in the front-rear direction, a front slide member being fixed to the base portion, a guide shaft corresponding to the front slide member being fixed to the seat cushion frame, a rear slide member being fixed to the seat cushion frame, and a guide shaft corresponding to the rear slide member being fixed to the base portion.

14. The vehicle seat according to claim 9, wherein all guide shafts are disposed between the pair of side frames when viewed from above or below.

15. The vehicle seat according to claim 8, wherein the transmission mechanism includes an actuator connected to the seat cushion frame, and a screw shaft extending in the front-rear direction, the screw shaft being configured to transmit a driving force from the drive source to the actuator, and wherein the screw shaft is disposed in a center between the pair of side frames.

16. The vehicle seat according to claim 8, wherein the side frames are made of pipes.

17. The vehicle seat according to claim 8, further comprising a pan frame fixed to the seat cushion frame, wherein the pan frame has an undersurface of which a portion lying over the transmission mechanism is recessed upward.

* * * * *